Oct. 30, 1962
J. T. CLARK
3,060,931
DIAPHRAGM AND METHOD OF MAKING
Filed May 13, 1960
2 Sheets-Sheet 1
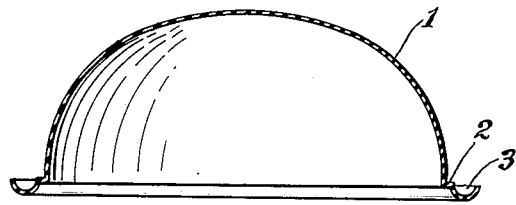
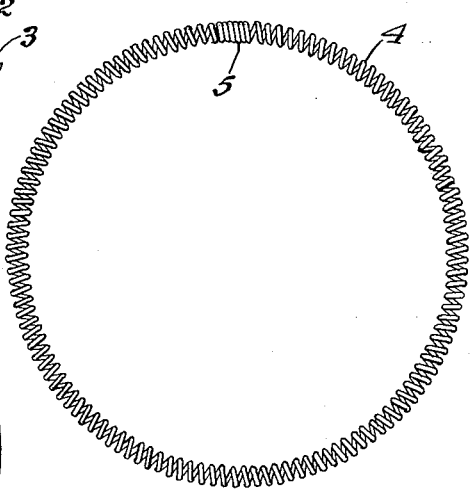
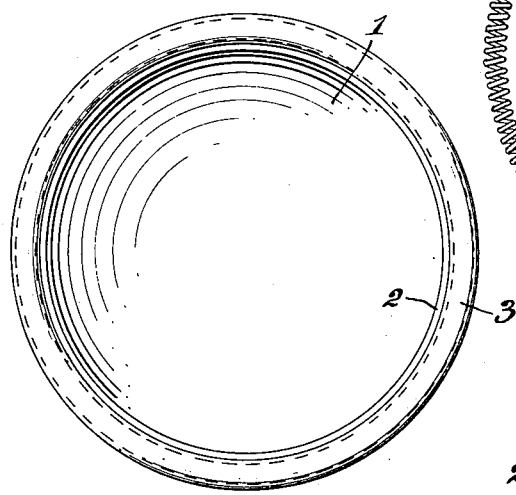
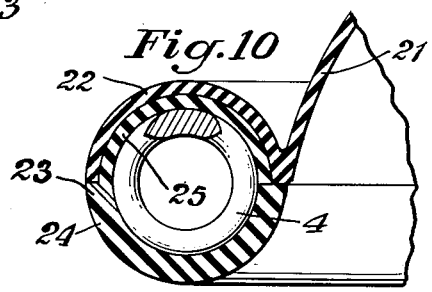
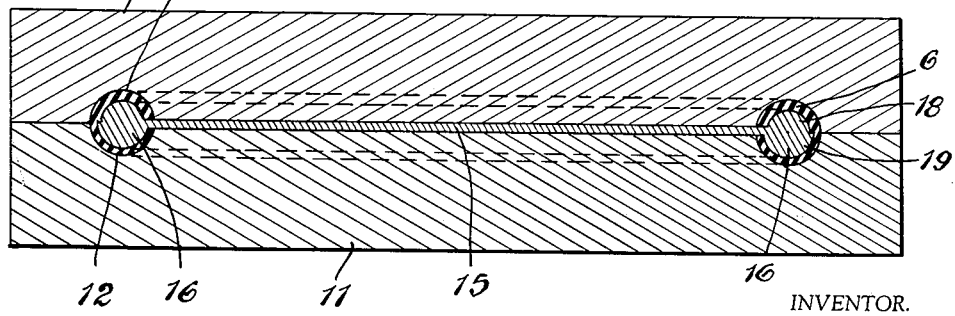
INVENTOR.
John T. Clark
BY
Parker & Carter
Attorneys

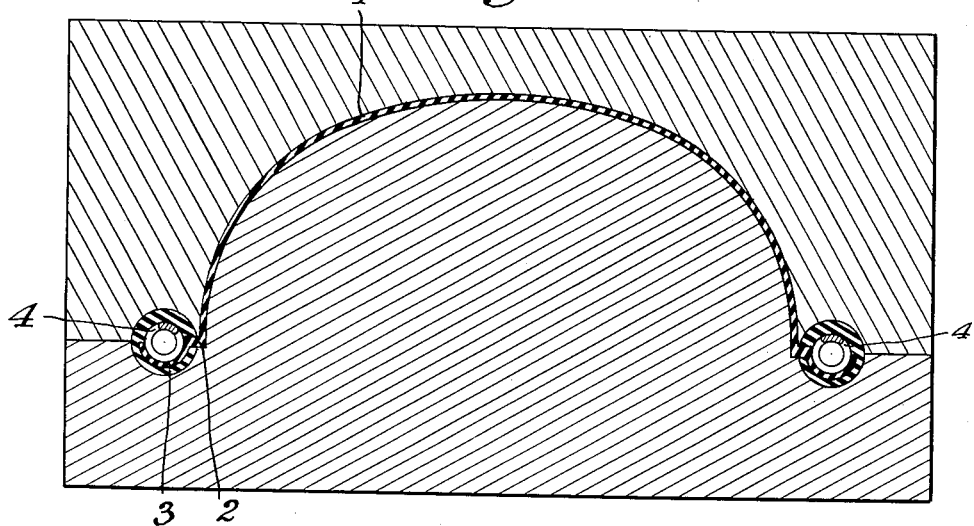
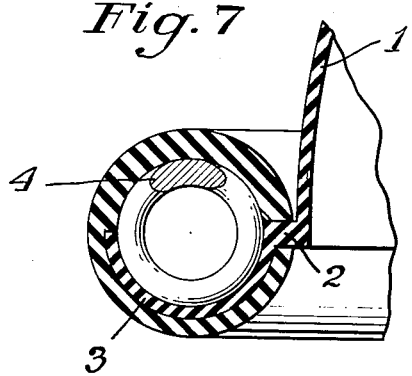
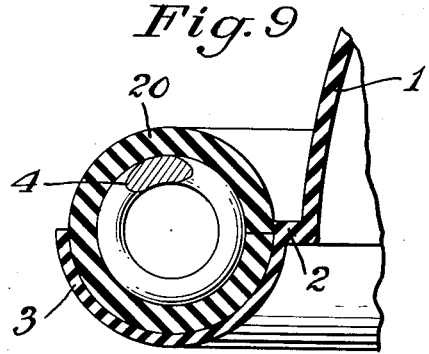
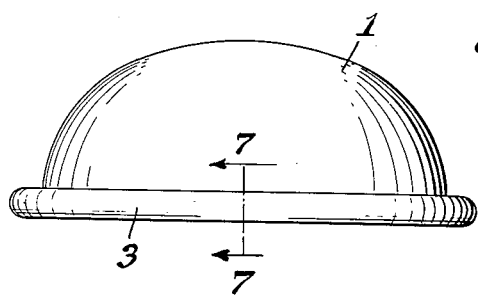
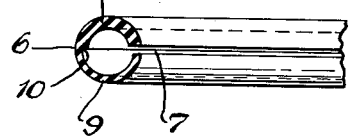
INVENTOR.
John T. Clark
BY
Parker & Carter
Attorneys

United States Patent Office 3,060,931
Patented Oct. 30, 1962

3,060,931
DIAPHRAGM AND METHOD OF MAKING
John T. Clark, Box 172, R.R. 2, St. Charles, Ill.
Filed May 13, 1960, Ser. No. 28,922
7 Claims. (Cl. 128—127)

This invention relates to a diaphragm structure and to a method of making it. It has for one object to provide a diaphragm which can be made with a a minimum of expense.

Another object is to provide a diaphragm which can be made in several parts and assembled and secured together as a unit.

Another object is to provide a diaphragm and a method for making it by means of which the several parts of a diaphragm will be separately molded of rubber or rubberlike material and subsequently assembled to form a unitary structure.

Another object is to provide a method of producing a diaphragm by means of which a diaphragm embodying a spring, which may or may not be metallic, is formed in separate parts, one to hold the spring and one comprising a dome, the spring being inserted in one member; that member and the dome being secured together thereafter to form a unitary structure.

Other purposes will appear from time to time during the course of the specification and claims.

I illustrate my invention more or less diagrammatically in the accompanying drawings, wherein:

FIG. 1 is a section through the dome of this invention;
FIG. 2 is a bottom view;
FIG. 3 is a plan view of one form of suitable spring;
FIG. 4 is a section through the mold in which the spring retainer or enclosing member is formed;
FIG. 5 is a section through a dome-forming mold which is also shaped to accommodate the spring and spring retainer for the production of a unitary device;
FIG. 6 is an elevation of the diaphragm complete;
FIG. 7 is a sectional detail taken at line 7—7 of FIG. 6 and illustrating, on an enlarged scale, the diaphragm of FIGS. 5 and 6;
FIG. 8 is a sectional detail taken through the spring retainer of the form of FIGS. 5 and 7;
FIG. 9 is a sectional detail of a modified form of diaphragm retainer; and
FIG. 10 is a sectional detail of a further modified form of diaphragm retainer and dome.

FIGS. 7, 9 and 10 are taken on the same scale. Each is an enlargement.

Like parts are indicated by like numerals throughout the specification and drawings.

As shown in FIG. 1, the dome comprises a domelike member 1 with a generally flat integral flange 2 and a curved troughlike integral extension 3.

One suitable form of spring is that shown in plan in FIG. 3. It comprises a helical spring 4 which is bent into an annulus. Its ends are joined as at 5 by any means. They may be intermeshed, welded, or otherwise secured together so that the spring comprises an annular spring.

As shown in FIG. 4, one suitable form of mold is diagrammatically illustrated. This is the mold which is used in forming the spring retainer. By the expression "spring retainer" a spring-enclosing, -covering or -retaining means is referred to. As shown in FIGS. 4 and 8 in particular, this comprises an annular hollow and open-sided ring 6. It may be formed of rubber or rubberlike material. As shown in detail in FIG. 8, it has an opening or slit on its inner face as at 7. Preferably, one part of it, for example the upper part of FIG. 8, comprises a thicker portion 8 and another part, shown in the lower half of FIG. 8, is a thinner portion 9.

There is thus provided a shoulder 10 where the thick portion 8 and the thin portion 9 adjoin.

The mold of FIG. 4 is arranged and proportioned to produce the spring retainer as shown in detail in FIG. 8. The mold comprises a lower member 11 shaped with an annular groove 12 of substantially semicircular cross section. The mold further comprises an upper portion 13 with an annular groove 14 of semicircular cross section formed in it. A sheetlike member 15 is positioned between the mold portions 11 and 13 which are shaped to provide space for it when they are in the position of FIG. 4. The portion 15 has, at its periphery, an annular enlargement 16 which is provided with two portions, each of substantially semicircular cross section. The upper portion 18 is shaped on a circle of less diameter than the lower portion 19. In use the mold produces the spring retainer of FIG. 8 and the parts of the mold are shaped and proportioned to produce a spring retainer of the shape, proportions and contour shown in FIG. 8.

In FIG. 7 the spring retainer of FIG. 8 is shown enclosing the spring of FIG. 3 and embracing the flange 2 and the grooved potrion 3 of the dome. With the parts in this position, if they have been molded separately they may be secured together by cementing, by molding, by vulcanizing, or by any desired method. When the rubber or rubberlike parts are vulcanized together they will become, in effect, a unitary structure having the shape shown in FIGS. 5, 6 and 7 and with the spring in place.

It is possible also to mold the spring retainer and to insert the spring in it and then to put the spring and retainer together in the mold of FIG. 5. At the same time a suitable quantity of material for forming the dome may be put in place and when proper heat and pressure are applied the dome-forming material will flow to fill the mold and to interfit with the retainer, as shown in FIG. 5, to produce the completed diaphragm of FIGS. 6 and 7. Thus the dome and the spring retainer may be molded complete and separate and thereafter assembled and secured together with the spring in place. An alternate method is to form the spring retainer separately and to put it with the spring in the mold and to form the dome in the mold and to secure it to the spring retainer as it is formed. Either method may be carried out to accomplish the result desired, namely the formation of a suitable diaphragm structure.

In the modification of FIG. 9 a modified spring retainer 20 is shown. It differs from that of FIG. 8 by the fact that it is of uniform thickness. It does not have the thick portion 8 and the thin portion 9 of the retainer 6, as shown in FIG. 8. With such a spring retainer as shown in FIG. 10 the spring is put in place and the retainer fits into the trough 3 of the dome and the parts are secured together by cementing, vulcanizing or otherwise.

In the further modification of FIG. 10 the dome is modified from the form of the earlier figures. There is thus a dome-shaped portion 21 and a grooved member 22. The members 21 and 22 are formed integrally with each other and the groove faces in the same direction as the concavity of the dome.

For cooperation with and attachment to the dome of FIG. 10 a modified spring retainer 23 is used. This spring retainer has a lower thickened portion 24 and an upper thinner portion 25. The internal diameter of the spring retainer 23 is uniform. The outer diameter varies because of the provision of the thicker portion 24 and the thinner portion 25. When the dome and the spring retainer are secured together, as shown in FIG. 10, the thinner portion 25 of the retainer cooperates with and is secured to the grooved portion 22 of the dome 21 and thus the spring 4 is surrounded by a uniform thickness of rubber or rubberlike material. The same effect is produced in the diaphragm of FIG. 7 except that in FIG. 7 the grooved portion 3 of the diaphragm is within the spring retainer, whereas in FIG. 10 the grooved portion 22 of the diaphragm is outside of the retainer.

Although an operative form of the device has been shown, the invention is not limited to the particular details shown. Many changes may be made in the form, shape and arrangement of parts without departing from the spirit of the invention.

The method of producing the diaphragm assembly is generally as follows:

The dome is molded separately from the spring and spring cover or retainer and the spring cover or retainer is separately molded. In practice it has been found in the past that when the diaphragm and spring retainer or cover are all molded together waste will frequently occur. It is one of the objects of the invention to provide a method which will avoid the waste incident to molding the entire diaphragm assembly as a unit. Frequently in the past where they have been molded together a defect may develop in the dome while the spring retainer is perfectly satisfactory. This requires "junking" of the entire diaphragm and frequently means the loss of the material and of the spring as well. Also, in the past the spring cover may have proven unsatisfactory while the dome attached to it is in perfect condition. Here again the entire device has had to be sacrificed, involving the waste of the material and the loss of the spring itself.

For purposes of discussion it is clear that the diaphragm comprises, in effect, two main members made of rubber or rubberlike material, the diaphragm proper and the spring retainer. In the manufacture defects may dedevelop in either one of the main parts. Where they are molded as a unit a defect in either part requires the "junking" of the entire device. Where they are molded separately, a defect in one is limited to the member in which the defect occurs. Consequently, by molding the parts separately and then assembling them, this waste is avoided. Also, they may be made more accurate both as to dimensions and as to weight. The spring may be more readily assembled in the molded retainer and the entire diaphragm assembly may thereafter readily be secured together by vulcanizing, cementing or otherwise.

In the method of producing the device of the invention the dome is molded, as shown in FIGS. 1 and 2 in particular. The shape given to the dome edges provides the portion 2 and the grooved portion 3. These are available and suitable to receive the spring and the spring retainer after these two have been assembled together.

The spring retainer or cover is separately molded, as shown in FIG. 8, by means of the mold of FIG. 4. The spring cover thus comprises a ring having a hollow of suitable size to receive the spring and having an open slot 7 through which the spring is inserted. The retainer is formed, as above mentioned, of flexible material and therefore it can be distorted to permit insertion of the spring. The spring itself is preferably made of wire but may be made of any material from which a spring of suitable characteristics may be formed.

Thus with a molded dome and a separately molded spring retainer and a spring, the parts are assembled. The spring is moved through the opening 7 into the retainer and the retainer is then put in place engaging the depression 3. In the form shown in FIGS. 5, 6 and 7, the spring retainer is so molded that the opening 7 remains open after the insertion of the spring. The width of the opening approximates the thickness of the portion 2 of the dome section. When the parts are assembled, as shown in FIGS. 5 and 7, the opening 7 is closed by reason of the fact that the portion 2 extends through and fills it. The portion 3, together with the thinner portion 9 of the spring retainer, completes a spring cover of uniform thickness.

With the parts assembled as shown in FIG. 5 the complete diaphragm may be inserted in a mold and subjected to heat and pressure or other conditions suitable for joining the spring retainer and the dome together as a unit. Vulcanizing will generally take place under these conditions and when the diaphragm, fully assembled, is removed from the mold, it is complete and the two separately molded parts, the dome and the spring retainer, are now held together so that the diaphragm assembly is ready for use.

In the form of FIG. 9 the spring retainer 20 differs from that shown in FIG. 8 in that it is of uniform thickness and it is normally molded with a minimum of clearance between its meeting edges. With this form of spring retainer, after the spring is inserted the retainer is placed in the member 3 and the parts may then be vulcanized together in the manner above described in connection with FIG. 5. This will produce, as shown in FIG. 9, a diaphragm in which a portion of the material surrounding the spring is thicker than another portion, the added thickness being due to the member 3.

In a third modification, which is shown in FIG. 10, the portion 2 is omitted from the dome and a grooved portion similar and more or less equivalent to the portion 3 appears. This is the portion 22. For use with the dome structure of FIG. 10 a modified spring cover or retainer is molded. It is similar to the form of FIG. 8 in that it has a thinner and thicker portion. However, its internal diameter is uniform and its external diameter is of two proportions. When the parts are assembled, as in FIG. 10, the thickness of the member 22 combined with the thin portion 25 produces a composite portion substantially equal in thickness to the portion 24 of the spring cover. Thus when the device is completed, the spring is surrounded by material of substantially uniform thickness.

When the parts are assembled, as shown in FIG. 10, they may be secured together by vulcanizing as in a mold generally like that of FIG. 5.

All of the forms of the device may be completed by securing the separately molded parts together by cementing or otherwise. The invention is not limited to the step of vulcanizing, nor to the use of the mold, such as that shown in FIG. 5 or its equivalent. Any step which unites the spring cover and the dome sufficiently so that the assembled diaphragm may be used as required, is within the contemplation of the invention.

The invention is not limited to the use of rubber. For some purposes high grade latex is considered preferable to other materials. However, synthetic materials and mixtures of synthetic and natural materials are available which can be used to produce a satisfactory diaphragm. It is possible to have the dome of one material and the spring retainer of another. The invention is, therefore, not limited to the use of rubber nor to the use of a single material. In a single diaphragm assembly the dome may be made of one material and the retainer of another.

I claim:

1. The method of making a composite diaphragm structure which includes the steps of molding a dome, molding integrally with said dome a spring receiving peripheral portion having a trough-like configuration separately molding a hollow ring and forming in said ring a slit, placing a spring within said hollow ring through said slit, placing said ring containing said spring in seated relation within said trough-like peripheral portion and securing said peripheral portion and said ring together.

2. The method of forming a flexible diaphragm which comprises the steps of molding a dome-like member and forming integrally with that member a continuous peripheral trough-like part, separately molding a hollow ring, forming a slit in the wall of said ring throughout its circumference, placing a continuous spring within said ring through said slit, seating said ring in said trough-like part and securing said ring to said trough-like part by simultaneously treating them under heat and pressure.

3. A diaphragm assembly comprising a dome-like member, a grooved portion extending around the periphery of said member and being integral therewith, a hollow ring having a slit therein throughout its circumference for receiving an annular spring, an annular spring seated within said hollow ring, said ring being seated in said grooved portion and means securing said ring to said portion.

4. A diaphragm assembly comprising a dome-like member, a trough-like portion extending around the periphery of said member, means connecting said trough-like portion to said periphery, said means being of a predetermined thickness, a hollow ring having a slit therein of a width substantially equal to said predetermined thickness, said slit extending throughout the circumference of said hollow ring for receiving an annular spring, an annular spring seated within said hollow ring, said trough-like portion extending into said slit in said ring such that said slit spans said connecting means and means securing said ring to said trough-like portion.

5. The structure of claim 3 further characterized by a flange connecting said dome-like member and grooved portion, said slit having a width substantially equal to the width of the flange.

6. The structure of claim 3 further characterized in that said grooved portion and ring interlock to form an annulus having a constant generally circular cross section.

7. The structure of claim 3 further characterized in that said groove opens in a direction opposite to the opening of said dome-like member.

References Cited in the file of this patent

UNITED STATES PATENTS

| | | |
|---|---|---|
| 563,387 | Keller | July 7, 1896 |
| 580,336 | Mortimer | Apr. 6, 1897 |
| 2,024,539 | Schmid | Dec. 17, 1935 |
| 2,111,313 | Clark | Mar. 15, 1938 |
| 2,252,758 | Clark et al. | Aug. 19, 1941 |
| 2,321,340 | Waterbury | June 8, 1943 |
| 2,697,057 | Senger et al. | Dec. 14, 1954 |